May 14, 1957  H. C. SHICKEL ET AL  2,791,798
POULTRY GIZZARD SKINNER

Filed Sept. 15, 1953  3 Sheets-Sheet 1

INVENTORS
HAROLD C. SHICKEL,
ERNEST J. FRANCIS,
BY  Martha Conway
ATTORNEY

May 14, 1957
H. C. SHICKEL ET AL
2,791,798
POULTRY GIZZARD SKINNER
Filed Sept. 15, 1953
3 Sheets-Sheet 2
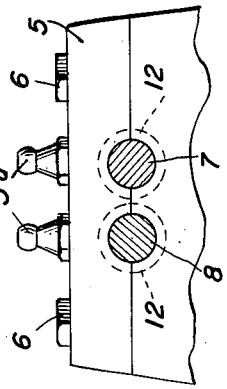
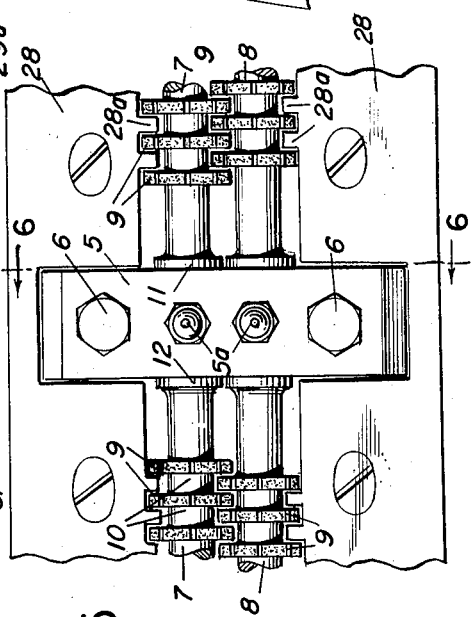
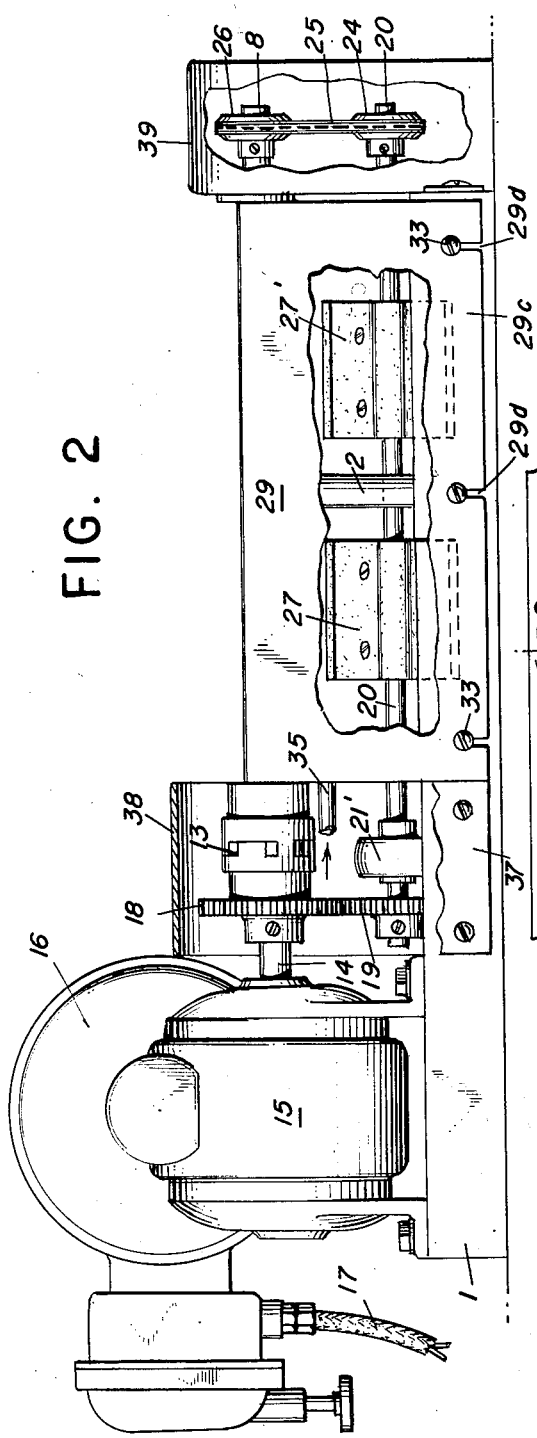
INVENTORS
HAROLD C. SHICKEL
ERNEST J. FRANCIS
BY Martha Conway
ATTORNEY INVENTORS
HAROLD C. SHICKEL,
ERNEST J. FRANCIS,
BY Martha Conway
ATTORNEY 2,791,798
POULTRY GIZZARD SKINNER Harold C. Shickel, Bridgewater, and Ernest J. Francis, Harrisonburg, Va.

Application September 15, 1953, Serial No. 380,291

5 Claims. (Cl. 17—11)

This invention relates to machines for removing the inner skin or lining from poultry gizzards, after they have been split open and the contents cleaned out.

The general object of the invention is the quick and easy removal of gizzard linings to speed up and reduce the cost of processing poultry for the market.

A more specific object is to improve upon and overcome the defects inherent in machines of the prior art and to devise a more efficient and trouble-free apparatus.

The exact nature of the present improvements will clearly appear from the following detailed description.

In order that the invention may be readily understood, reference is had to the accompanying drawings, forming part of this specification, and in which:

Fig. 2 is a side elevation thereof, parts being in section, and parts being broken away;

Fig. 5 is a fragmentary plan view on an enlarged scale of parts of the machine shown in Fig. 1; and Fig. 6 is a fragmentary section on the line 6—6 of Fig. 5, looking in the direction of the arrows.

Figure 1:
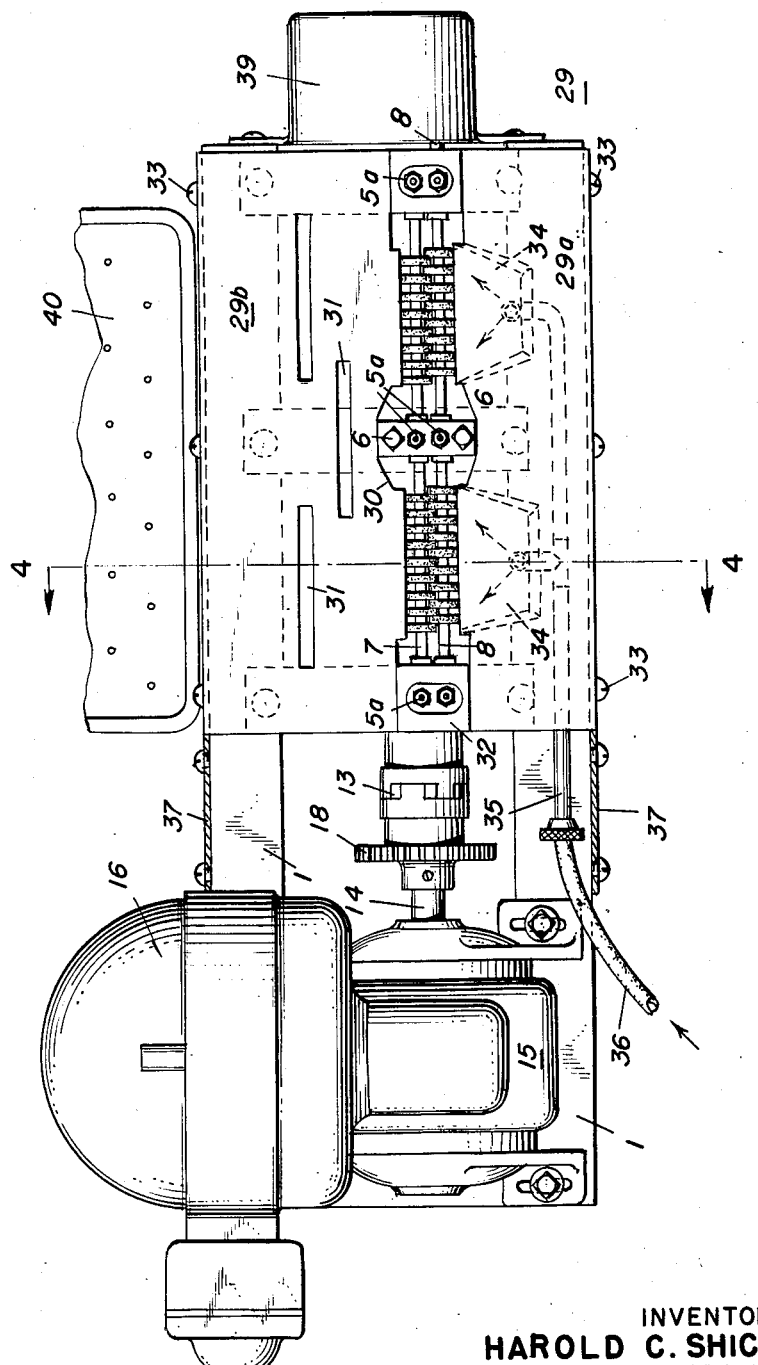
Fig. 1 is a plan view of the complete, improved machine, parts being in section.

Referring to the drawings in detail the machine comprises a suitable frame or base 1 on which the various parts are mounted. Rising from this base adjacent the two ends of the machine are pairs of posts 2 and 2' bridged by horizontal bars 3 and 3' on which are supported a pair of bearings 4 and 4' (see Figs. 3 and 4). Substantially midway between the bearings 4 and 4' and similarly supported, is a third bearing 5. This is split horizontally into two sections held together by bolts 6 (see Fig. 6). The sections of the bearing have flat vertical sides.

Journalled in the three bearings 4, 4' and 5 are a pair of rollers 7 and 8, horizontally disposed in close parallel relation. The several bearings are preferably equipped with Alemite fittings 5ª for proper lubrication of the roller shafts.

These rollers 7 and 8 are each formed with a series of flat sided annular ridges 9 spaced apart to form grooves between them, the ridges of one roller fitting into the grooves of the other roller as clearly shown in Fig. 5. These ridges preferably have knurled and notched edges, constituting a gizzard supporting surface, the same as shown in Patent No. 2,620,510 to Darrow et al., and as explained in said patent, the thickness of the ridges and the width of the grooves is such that there is a small space or clearance provided between the ridges, and between the edges of the ridges and the bottoms of the grooves. Thus the ridges do not run closely enough together to provide a shearing action but the slight space between them enables them to exert a pinching action on the skins being removed, as hereinafter more fully described.

One of the difficulties encountered in the practical operation of machines of the prior art is the fact that there is a tendency for the rollers to be displaced axially relative to each other with the result that the ridges sometimes climb up on each other, thus subjecting the machine to a tremendous strain, causing bending of breaking of the parts. One of the objects of the present invention is to completely overcome this difficulty and to this end special means are provided for absolutely preventing any endwise movement of the rollers. As shown, this special means comprises collars 11 and 12 formed integral with the rollers and adapted to bear against the flat sides of the central bearing 5, as best shown in Fig. 5. Similar collars may also be provided at the ends of the rollers adjacent the bearings 4 and 4'. By virtue of these collars it will be seen that the rollers are maintained in absolutely fixed axial positions.

At the left hand of the machine as viewed in Figs. 1 and 2 the roller 7 is connected with a flexible coupling 13 which joins this roller directly with a shaft 14 mounted in a gear box 15 containing speed reduction gearing driven by a suitable electric motor 16, to which current is supplied by a cable 17.

Mounted on the shaft 14 is a gear 18 which meshes with a similar gear 19 mounted on a shaft 20 journalled in bearings 21 and 21' at each end of the machine, these bearings being secured by bolts 22 and 22' to supporting bars 23 and 23' welded to the frame of the machine.

At the right hand end of the machine as viewed in Fig. 2 the roller 8 is extended beyond the roller 7 and carries a sprocket 26 and a sprocket chain 25 passes around this sprocket and a similar sprocket 24, secured to the shaft 20. Thus the roller 8 is driven from the shaft 20 through the sprocket chain 25.

Figure 4:
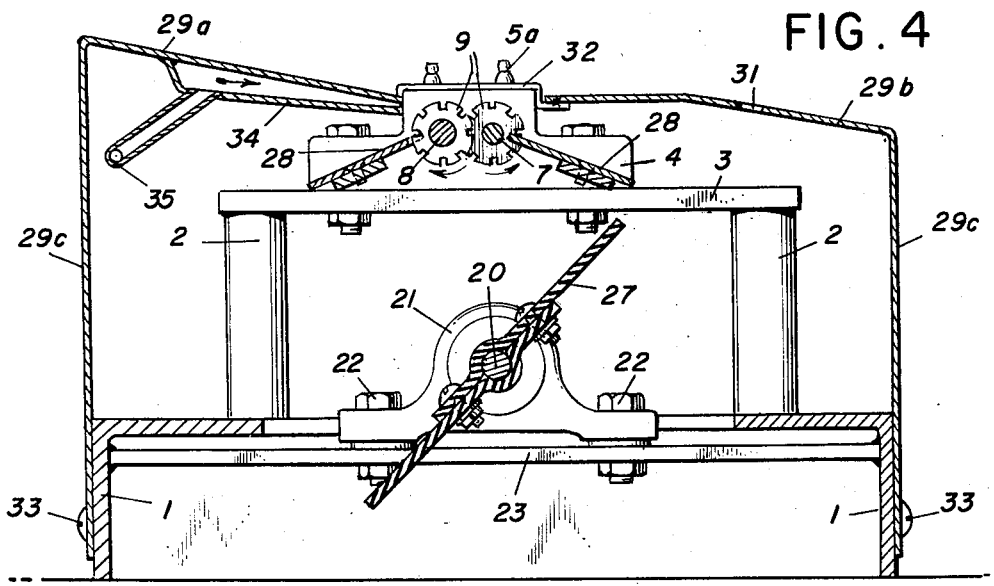
Fig. 4 is a transverse section on an enlarged scale on the line 4—4 of Fig. 1.

From the foregoing it will be seen that one of the rollers is driven directly from the gear box shaft 14 at one end of the machine, while the other roller is driven from the shaft 20 at the other end of the machine, and it will be noted that as in the above identified patent the rollers turn in opposite directions as indicated by the arrows in Fig. 4.

Secured to the shaft 20 are a pair of wipers 27 and 27' which rotate with the shaft and the ends of which move in close proximity to the rollers 7 and 8 so as to assist in removing any skins or the like which may adhere to the rollers.

As in the prior art the present machine is provided with combs for stripping or removing from the rollers any material tending to adhere thereto. The combs consist of plates 28 having serrated edges providing teeth 28ª which project into the grooves between the ridges as clearly shown in Fig. 5. While, however, in certain prior patents these combs were shown as disposed horizontally, in the present machine they are inclined at a substantial angle as shown in Fig. 4, and have free lower edges. This facilitates the discharge of material from them, especially where, as hereinafter described, a stream of water is used to assist in discharging this material. The rollers and associated mechanism as above described are completely enclosed in a housing designated generally by the numeral 29. This housing comprises a top portion 29ª, preferably inclined and constituting a feed table, another top portion 29ᵇ constituting a discharge table, and side portions 29ᶜ secured at their lower edges to the frame. Between the top portions 29ª and 29ᵇ is an elongated opening 30, affording access to the rollers and the portion 29ᵇ is preferably formed with a plurality of longitudinally extending parallel slots 31 to facilitate the discharge of water. The top portions 29ª and 29ᵇ are supported at their ends on plates 32 resting on the bearings 4 and 4' (see Figs. 3 and 4).

As it is desirable to be able to remove the housing 29 for the purpose of cleaning the machine it is preferably secured to the frame by means of open ended slots 29ᵈ (see Fig. 2) through which pass clamping screws 33. By loosening the screws 33 the housing may be readily lifted upward and removed.

Rigidly secured beneath the feed table portion 29ᵃ of the housing 29 are a pair of relatively wide and thin water nozzles 34. By reference to Fig. 1 it will be seen that each of these nozzles is of a width substantially equal to the length of the operative part of the rollers 7 and 8 extending between the pairs of bearings, and from Figs. 3 and 4 it will be seen that the discharge end of these nozzles terminates at the edge of the feed table 29ᵃ closely adjacent and parallel with the rollers. A water pipe 35 is connected with the nozzles 34 and is provided at its end with a suitable coupling for the attachment of a flexible hose 36.

Figure 3:
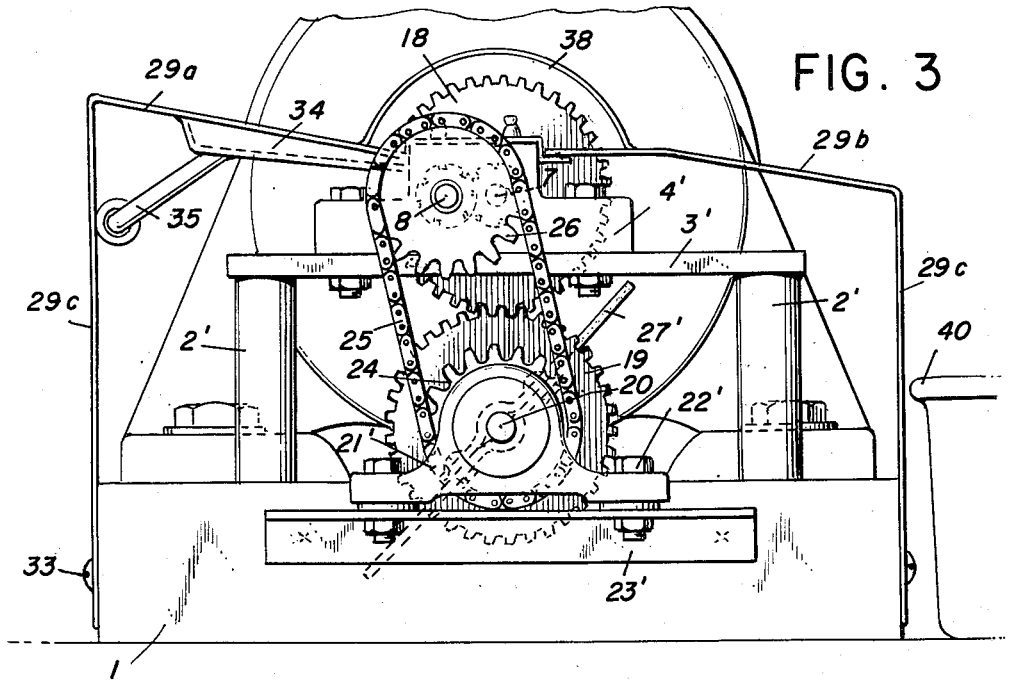
Fig. 3 is an end elevation, on an enlarged scale, part of the housing being omitted.

The gears 18 and 19 and associated parts are enclosed in a housing 37 which, as shown in Fig. 3, is formed with a dome shaped portion 38 overlying the gear 18. Both the top and sides of this housing 37 lie in substantially the same plane as the corresponding parts of the housing 29. At the right hand end of the machine housing 39 encloses the sprockets 24 and 26 and chain 25. A suitable pan or other receptacle 40 is placed adjacent the side of the discharge table 29ᵇ to receive the gizzards passing over the same.

In operation, the gizzards having first been opened and cleaned, are moved over the feed table on to the rollers 7 and 8 where the skins or linings are gripped or pinched by the annular ridges and pulled from the gizzards. Meanwhile, a continuous stream of water is directed over the rollers from the nozzles 34 and this assists in the operation and in washing away skin fragments or other undesired material. Most of the water passing down the discharge table with the skinned gizzards escapes through the slots 31, while the gizzards are discharged in the pan 40. As in said patent, the skins are discharged downwardly below the rollers into a suitable receptacle.

What we claim is:

1. A machine for removing the lining from previously opened poultry gizzards, said machine comprising a frame, a pair of rollers, each of said rollers having a plurality of axially spaced annular ridges forming grooves therebetween, said rollers being journalled in bearings in said frame in parallel relation, with the ridges of one roller fitting into the grooves of the other roller, power means connected with said rollers for rotating them in opposite directions, and transversely directed water supply means for delivering a continuous stream of water over substantially the entire operative length of said rollers transversely of the axes thereof.

2. A machine for removing the lining from previously opened poultry gizzards, said machine comprising a frame, a pair of rollers, each of said rollers having a plurality of axially spaced annular ridges forming grooves therebetween, said rollers being journalled in bearings in said frame in parallel relation, with the ridges of one roller fitting into the grooves of the other roller, power means connected with said rollers for rotating them in opposite directions, a feed table over which the gizzards are moved to the rollers, and a nozzle of a width substantially equal to the operative length of said rollers disposed immediately beneath and secured to said feed table for delivering a stream of water over said rollers transversely of the axes thereof.

3. A machine for removing the lining from previously opened poultry gizzards, said machine comprising a frame, a pair of rollers, each of said rollers having a plurality of axially spaced annular ridges forming grooves therebetween, said rollers being journalled in bearings in said frame in parallel relation, with the ridges of one roller fitting into the grooves of the other roller, power means connected with said rollers for rotating them in opposite directions, a feed table over which the gizzards are moved to the rollers, said table having its edge disposed adjacent and parallel with said rollers, and a relatively wide water delivery nozzle directed transversely of said rollers and disposed immediately beneath said feed table and having its delivery end substantially coinciding with the edge of said table which is adjacent and parallel with said rollers.

4. A machine for removing the lining from previously opened poultry gizzards, said machine comprising a frame, a pair of rollers, each of said rollers having a plurality of axially spaced annular ridges forming grooves therebetween, said rolletrs being journalled in bearings in said frame in parallel relation, with the ridges of one roller fitting into the grooves of the other roller, power means connected with said rollers for rotating them in opposite directions, a removable housing enclosing said rollers and having a top and sides, said top having an elongated opening immediately above said rollers to expose the same, a portion of said top on one side of said opening constituting a feed table, a water pipe and nozzle carried by said housing for delivering a stream of water over said rollers, said nozzle being disposed immediately beneath said feed table and directed transversely of said rollers, the portion of said top at the other side of said opening constituting a discharge table and having a series of longitudinally extending slots therein.

5. A machine for removing the lining from previously opened poultry gizzards, said machine comprising a frame, a pair of rollers, each of said rollers having a plurality of axially spaced annular ridges forming grooves therebetween, said rollers being journalled in bearings in said frame in parallel relation, with the ridges of one roller fitting into the grooves of the other roller, a shaft extending parallel with and below said rollers, power means connected with one end of one of said rollers and with the adjacent end of said shaft, means operatively associated with said shaft for transmitting power from the other end of said shaft to the other of said rollers, and a wiper mounted on and rotating with said shaft, said wiper moving transversely past said rollers in close proximity thereto.

References Cited in the file of this patent
UNITED STATES PATENTS

| | | |
|---|---|---|
| 1,972,680 | Cushman | Sept. 4, 1934 |
| 2,451,130 | Townsend | Oct. 12, 1948 |
| 2,620,510 | Darrow et al. | Dec. 9, 1952 |
| 2,630,599 | Grant et al. | Mar. 10, 1953 |